US010406862B2

(12) United States Patent
Besson et al.

(10) Patent No.: US 10,406,862 B2
(45) Date of Patent: *Sep. 10, 2019

(54) TIRE COMPRISING A LAYER OF CIRCUMFERENTIAL REINFORCING ELEMENTS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Jacques Besson, Clermont-Ferrand (FR); François Barbarin, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 862 days.

This patent is subject to a terminal disclaimer.

(21) Appl. No.: 14/363,873

(22) PCT Filed: Nov. 5, 2012

(86) PCT No.: PCT/EP2012/071823
§ 371 (c)(1),
(2) Date: Jun. 9, 2014

(87) PCT Pub. No.: WO2013/083339
PCT Pub. Date: Jun. 13, 2013

(65) Prior Publication Data
US 2014/0345773 A1    Nov. 27, 2014

(30) Foreign Application Priority Data
Dec. 9, 2011 (FR) ...................... 11 61363

(51) Int. Cl.
*B60C 1/00* (2006.01)
*B60C 9/18* (2006.01)
(Continued)

(52) U.S. Cl.
CPC ................ *B60C 9/185* (2013.01); *B60C 1/00* (2013.01); *B60C 9/0007* (2013.01); *B60C 9/20* (2013.01);
(Continued)

(58) Field of Classification Search
CPC ...... Y10T 152/1081; B60C 2001/0066; B60C 2009/2064; B60C 2009/2061;
(Continued)

(56) References Cited

U.S. PATENT DOCUMENTS 3,583,463 A * 6/1971 O'Neil ...................... 152/537 X
4,477,621 A * 10/1984 Sato .......................... 524/496 X
(Continued)

FOREIGN PATENT DOCUMENTS

EP        0722977 A1    7/1996
JP     2006-143821 A    6/2006
(Continued)

OTHER PUBLICATIONS

Mechanics of Pneumatic Tires, ed. Samuel Clark, US Dept. of Transportation, Aug. 1981, pp. 25-27.*
(Continued)

*Primary Examiner* — Adrienne C. Johnstone
(74) *Attorney, Agent, or Firm* — Dickinson Wright PLLC (57) ABSTRACT

A tire comprising a crown reinforcement formed from at least two working crown layers of reinforcing elements and at least one layer of circumferential reinforcing elements, wherein, the tensile modulus of elasticity at 10% elongation of at least one skim coat of at least one working crown layer
(Continued)

is greater than 9 MPa and the maximum value of tan(δ), denoted tan(δ)max, of said skim coat is less than 0.100.

13 Claims, 3 Drawing Sheets (51) Int. Cl.
*B60C 9/20* (2006.01)
*B60C 9/00* (2006.01)
*C08K 3/04* (2006.01)

(52) U.S. Cl.
CPC .... *B60C 9/2003* (2013.01); *B60C 2001/0066* (2013.01); *B60C 2009/208* (2013.01); *B60C 2009/2016* (2013.01); *B60C 2009/2019* (2013.01); *B60C 2009/2064* (2013.01); *B60C 2200/06* (2013.01); *C08K 3/04* (2013.01); *Y10T 152/1081* (2015.01); *Y10T 152/10801* (2015.01)

(58) Field of Classification Search
CPC .... B60C 2009/0021; B60C 9/20–2009; B60C 1/00; C08K 3/04
USPC .................................. 152/537; 524/495–496
See application file for complete search history.

(56) References Cited

U.S. PATENT DOCUMENTS

| 4,788,241 | A | * | 11/1988 | Cornell | |
| 5,871,597 | A | | 2/1999 | Vasseur | |
| 6,169,137 | B1 | | 1/2001 | Vasseur | |
| 7,799,862 | B2 | * | 9/2010 | Chauvin | ................. C08K 3/04 524/496 |
| 2006/0102269 | A1 | | 5/2006 | Uchida et al. | |
| 2006/0169380 | A1 | | 8/2006 | Radulescu et al. | |
| 2009/0084485 | A1 | | 4/2009 | Netzer et al. | |
| 2014/0332137 | A1 | * | 11/2014 | Besson | |

FOREIGN PATENT DOCUMENTS

| JP | 2008189048 A | 8/2008 |
| JP | 2008-544914 A | 12/2008 |
| WO | 2005016668 | 2/2005 |

OTHER PUBLICATIONS

PCT/EP2012/071823, International Search Report (ISR), Form PCT/ISA/210, dated Dec. 6, 2012 (including English translation), 6 pgs.
Japanese Office Action (with English translation) for related Japanese Application No. 2014-545147, dated Jun. 19, 2017.

* cited by examiner

TIRE COMPRISING A LAYER OF CIRCUMFERENTIAL REINFORCING ELEMENTS

This application is a 371 national phase entry of PCT/EP2012/071823, filed 5 Nov. 2012, which claims benefit of the filing date of FR 1161363, filed 9 Dec. 2011.

BACKGROUND

1. Field

The present disclosure relates to a tire with a radial carcass reinforcement, and more particularly a tire intended for fitting to vehicles carrying heavy loads and travelling at sustained speeds, such as lorries, tractors, trailers or buses.

2. Description of Related Art

In the tires of heavy goods vehicles, the carcass reinforcement is generally fixed on either side in the area of the bead and is surmounted radially by a crown reinforcement composed of at least two layers, superimposed and formed of parallel threads or cords in each layer, with each layer crossing the next at angles in the range from 10° to 45° to the circumferential direction. Said working layers forming the working reinforcement may be further covered by at least one layer, called the protective layer, formed by reinforcing elements which are advantageously metallic and extensible and are called elastic. It may also comprise a layer of metal threads or cords having low extensibility, forming an angle in the range from 45° to 90° to the circumferential direction, this layer, called the triangulation layer, being radially located between the carcass reinforcement and the first crown ply, formed by parallel threads or cables lying at angles not exceeding 45° in absolute terms. The triangulation ply forms a triangulated reinforcement with at least said working ply, this reinforcement having low deformation under the various stresses which it undergoes, the triangulation ply essentially serving to absorb the transverse compressive forces acting on all the reinforcing elements in the crown area of the tire.

Cords are called inextensible if said cords have a relative elongation of not more than 0.2% under a tensile load equal to 10% of the breaking load.

Cords are called elastic if said cords have a relative elongation of at least 3% under a tensile load equal to the breaking load, with a maximum tangent modulus of less than 150 GPa.

Circumferential reinforcing elements are reinforcing elements which form angles to the circumferential direction in the range +2.5°, −2.5° around 0°.

The circumferential direction of the tire, or the longitudinal direction, is the direction which corresponds to the periphery of the tire and which is defined by the rolling direction of the tire.

The transverse or axial direction of the tire is parallel to the axis of rotation of the tire.

The radial direction is a direction cutting the axis of rotation of the tire and perpendicular thereto.

The axis of rotation of the tire is the axis around which it revolves in normal use.

A radial or meridian plane is a plane containing the axis of rotation of the tire.

The circumferential mid-plane, or equatorial plane, is a plane which is perpendicular to the axis of rotation of the tire and divides the tire into two halves.

The "modulus of elasticity" of a rubber mixture is considered to be a secant modulus of extension at 10% deformation and at ambient temperature.

Where rubber compositions are concerned, measurements of the modulus are performed under tension according to the AFNOR-NFT-46002 standard of September 1988: the nominal secant modulus (or apparent stress, in MPa) is measured in a second elongation (i.e. after an adaptation cycle) at 10% elongation (in normal conditions of temperature and humidity according to the AFNOR-NFT-40101 standard of December 1979).

Some present-day tires, called "road tires", are intended to roll at high speed over increasingly long distances, because of the improvement of the road network and the growth of the worldwide road network. Unquestionably, the set of conditions in which a tire of this type is required to roll enables the mileage covered to be increased; however, the endurance of the tire, and particularly that of the crown reinforcement, is adversely affected.

This is because stresses are present at the position of the crown reinforcement; more particularly, there are shear stresses between the crown layers, combined with a non-negligible rise in the operating temperature at the ends of the axially shortest crown layer, resulting in the appearance and propagation of cracks in the rubber at said ends.

In order to improve the endurance of the crown reinforcement of the type of tire in question, solutions have already been proposed regarding the structure and quality of the layers and/or profiled elements of rubber mixtures which are placed between and/or around the ends of the plies, and more particularly the ends of the axially shortest ply.

There is, notably, a known way of introducing a layer of rubber mixture between the ends of the working layers to create decoupling between said ends in order to limit the shear stresses. However, these decoupling layers must have a very high degree of cohesion. These layers of rubber mixtures are described, for example, in patent application WO2004/076204.

In order to improve the resistance to degradation of rubber mixtures located in the vicinity of the edges of the crown reinforcement, the patent FR 1 389 428 recommends the use, in combination with a low-hysteresis tread, of a rubber profiled element covering at least the sides and marginal edges of the crown reinforcement and composed of a rubber mixture with low hysteresis.

In order to avoid separations between the crown reinforcement plies, patent FR 2 222 232 teaches the embedding of the reinforcement ends in a rubber pad whose Shore A hardness is different from that of the tread surmounting said reinforcement, and greater than the Shore A hardness of the profiled element of rubber mixture placed between the edges of the crown reinforcement plies and the carcass reinforcement.

Tires made in this way can indeed improve performance, notably in terms of endurance.

There is also a known way of making tires with a very wide tread, or introducing a layer of circumferential reinforcing elements to impart greater load-bearing capacity to tires of a given size. Patent application WO 99/24269 describes, for example, the presence of a layer of circumferential reinforcing elements of this type.

The layer of circumferential reinforcing elements is usually formed by at least one metallic cord wound to form a turn whose angle of lay with respect to the circumferential direction is less than 2.5°.

SUMMARY

One object of embodiments of the invention is to provide tires whose properties, notably those of endurance and wear, are conserved regardless of use, and whose performance in terms of rolling resistance is improved in order to help reduce fuel consumption in vehicles fitted with these tires.

This object is achieved according to embodiments of the invention by a tire with a radial carcass reinforcement, comprising a crown reinforcement formed from at least two working crown layers of reinforcing elements, with one layer crossing the next at angles in the range from 10° to 45° with the circumferential direction, said at least two working crown layers each being formed of reinforcing elements inserted between two skim coats of rubber mixture, the crown reinforcement being capped radially by a tread, said tread being joined to two beads via two sidewalls, the crown reinforcement including at least one layer of circumferential reinforcing elements, the tensile modulus of elasticity at 10% elongation of at least one skim coat of at least one working crown layer being greater than 9 MPa, the maximum value of tan(δ), denoted $\tan(\delta)_{max}$, of said at least one skim coat of at least one working crown layer being less than 0.100 and said at least one skim coat of at least one working crown layer being an elastomeric mixture based on natural rubber or synthetic polyisoprene with a majority of cis-1,4 chains, and possibly at least one other diene elastomer, the natural rubber or the synthetic polyisoprene in case of blending being present in a majority proportion relative to the proportion of the other diene elastomer or elastomers used, and a reinforcing filler composed of:

a) either carbon black with a BET specific surface of less than 60 m$^2$/g, regardless of its structural index, used in a proportion of 40 to 100 phr, and preferably 60 to 90 phr, b) or a white filler of the silica and/or alumina type having SiOH and/or AlOH surface functions, chosen from the group formed by precipitated or pyrogenic silicas, aluminas or aluminosilicates, or carbon blacks modified during or after synthesis with a BET specific surface in the range from 30 to 260 m$^2$/g, used in a proportion of 40 to 100 phr, and preferably 60 to 90 phr, c) or a blend of carbon black described in a) and a white filler described in b) in which the overall proportion of filler is 40 to 100 phr, and preferably 60 to 90 phr.

Advantageously, according to embodiments of the invention the tensile modulus of elasticity at 10% elongation of at least one skim coat of at least one working crown layer is greater than 10 MPa.

Advantageously also, according to embodiments of the invention, in the case of a reinforcing filler consisting of a blend of carbon black described in a) and of a white filler described in b), the white filler is used in a proportion ranging from 45 to 95 phr, and the overall filler proportion ranges from 50 to 100 phr.

The BET specific surface is measured by the Brunauer, Emmet and Teller method, described in "The Journal of the American Chemical Society", vol. 60, p. 309, February 1938, corresponding to the NFT 45007 standard of November 1987.

The loss factor, tan(δ), is a dynamic property of the layer of rubber mixture. It is measured with a viscosity analyser, known by the trade name Metravib VA4000, according to ASTM D5992-96. The response of a sample of vulcanized rubber composition (cylindrical test specimen with a thickness of 4 mm and a cross section of 400 mm$^2$), subjected to alternating simple sinusoidal shear stress at a frequency of 10 Hz and a temperature of 100° C., is recorded. A peak-to-peak deformation amplitude scan is performed from 0.1% to 50% (outward cycle) and then from 50% to 1% (return cycle). For the return cycle, the maximum observed value of tan(δ), denoted $\tan(\delta)_{max}$ is indicated.

The rolling resistance is the resistance appearing when the tire rolls. It is represented by the hysteresis losses associated with the deformation of the tire during one revolution. The frequency values associated with the revolution of the tire correspond to values of tan(δ) measured between 30° C. and 100° C. Thus the value of tan(δ) at 100° C. corresponds to an indicator of the rolling resistance of the tire while it is rolling.

It is also possible to estimate the rolling resistance by measuring the energy losses by rebound of specimens at a set energy level at temperatures of 60° C., expressed in percentage terms.

Advantageously, according to embodiments of the invention, the loss at 60° C., denoted P60, of said at least one skim coat of at least one working crown layer is less than 20%.

By using these mixtures whose moduli of elasticity are greater than or equal to 9 MPa and in which the value of $\tan(\delta)_{max}$ is less than 0.100, it is possible to improve the properties of the tire in terms of rolling resistance, while retaining satisfactory endurance properties.

If a clear filler or white filler is used, a coupling and/or coating agent, chosen from agents known to those skilled in the art, must be used. Examples of preferred coupling agents that may be mentioned are sulphurized alkoxysilanes of the bis-(3-trialkoxysilylpropyl) polysulphide type, and of these, notably, the bis(3-triethoxysilylpropyl) tetrasulphide marketed by the Degussa Corporation under the trade names Si69 for the pure liquid product and X50S for the solid product (blended 50/50 by weight with N330 black). Examples of coating agents that may be mentioned are fatty alcohol, alkylalkoxysilane such as hexadecyltrimethoxy or triethoxy silane marketed by the Degussa Corporation under the trade names Si116 and Si216 respectively, diphenylguanidine, polyethylene glycol, and silicone oil, modified by means of the OH or alkoxy functions if required. The coating and/or coupling agent is used in a proportion of ≥1/100 and ≤20/100 by weight to the filler, and preferably in the range from 2/100 to 15/100 if the clear filler forms the whole of the reinforcing filler and in the range from 1/100 to 20/100 if the reinforcing filler is formed by a blend of carbon black and clear filler.

We may mention other examples of reinforcing fillers, having the morphology and SiOH and/or AlOH surface functions of the materials of the silica and/or alumina type described above and suitable for use according to the invention in total or partial replacement of these, including carbon blacks modified either during synthesis by the addition of a silicon and/or aluminium compound to the oil supplied to the furnace, or after synthesis by the addition of an acid to an aqueous suspension of carbon black in a sodium silicate and/or aluminate solution so as to coat at least part of the surface of the carbon black with SiOH and/or AlOH functions. Some non-limiting examples of this type of carbonated filler with SiOH and/or AlOH surface functions that may be mentioned are the CSDP fillers described at Conference No. 24 of the ACS Meeting, Rubber Division, Anaheim, Calif., 6-9 May 1997, and those mentioned in patent application EP-A-0 799 854.

If a clear filler is used as the sole reinforcing filler, the properties of hysteresis and cohesion are obtained by using a precipitated or pyrogenic silica or a precipitated alumina or an aluminosilicate with a BET specific surface in the range from 30 to 260 m$^2$/g. Some non-limiting examples of this type of filler that may be mentioned are the following silicas: KS404, marketed by the Akzo Corporation, Ultrasil VN2 or VN3 and BV3370GR marketed by the Degussa Corporation, Zeopol 8745 marketed by the Huber Corporation, Zeosil 175 MP or Zeosil 1165 MP marketed by the Rhodia Corporation, HI-SIL 2000 marketed by the PPG Corporation, etc.

Advantageously, said at least one skim coat of at least one crown working layer is made up of an elastomeric mixture containing no system of the methylene acceptor/donor type, resins, known adhesion-promoting systems of the RFS (resorcinol-formaldehyde-silica) type, these systems being known to be sources of formol—an element that is detrimental to health.

Among the diene elastomers that may be used in a blend with natural rubber or a synthetic polyisoprene with a majority of cis-1,4 chains, we may mention polybutadiene (BR), preferably with a majority of cis-1,4 chains, styrene-butadiene copolymer (SBR) solution or emulsion, butadiene-isoprene copolymer (BIR), and stirene-butadiene-isoprene terpolymer (SBIR). These elastomers may be elastomers modified during polymerization or after polymerization by means of branching agents such as divinylbenzene or star forming agents such as carbonates, tin halogens and silicon halogens, or alternatively by means of functionalizing agents causing oxygenated carbonyl, carboxyl functions or an amine function to be grafted on to the chain or at the end of the chain, by the action of dimethyl- or diethylamino-benzophenone for example. In the case of blends of natural rubber or synthetic polyisoprene with a majority of cis-1,4 chains with one or more diene elastomers, mentioned above, the natural rubber or synthetic polyisoprene is preferably used in a majority proportion and more preferably in a proportion of more than 70 phr.

The choice of the reinforcing filler used in the rubber mixture forming the layer C is a contributory factor in obtaining the values of tensile modulus of elasticity at 10% elongation, as well as in obtaining the values of $\tan(\delta)_{max}$. However, within the aforementioned ranges of values regarding said reinforcing fillers, a person skilled in the art will also be capable of adapting the quantities of other customary constituents, such as vulcanizing agents or cobalt derivatives, or adapting the mixing methods to obtain the aforementioned values of the modulus of elasticity and of $\tan(\delta)_{max}$.

The more commonly used tire designs include skim coats of the working crown layers with tensile moduli of elasticity at 10% elongation substantially equivalent to those of said at least one skim coat of at least one working crown layer according to the invention, but with maximum values of $\tan(\delta)$, denoted $\tan(\delta)_{max}$, of the skim coats of the working crown layers of more than 0.120. These more commonly used mixtures for this type of layer result in better cohesion.

For the purposes of embodiments of the invention, a cohesive rubber mixture is a rubber mixture which is, notably, resistant to cracking. The cohesion of a mixture is therefore evaluated by a fatigue cracking test conducted on a test specimen "PS" (simple shear). In this test, the test specimen is notched, and the propagation speed of a crack "Vp" (nm/cycle) is then determined as a function of the energy release rate "E" (J/m2). The experimental domain covered by the measurement lies within the temperature range of −20° C. to +150° C., in an atmosphere of air or nitrogen. The loading of the test specimen is an applied dynamic displacement with an amplitude in the range from 0.1 to 10 mm, in the form of impulsive loading (a tangential "haversine" signal) with a rest interval equal to the duration of the impulse; the frequency of the signal is about 10 Hz on average.

The measurement comprises three parts:

An adaptation of the test specimen "PS" for 1000 cycles at 27% deformation.

Energy characterization to determine the relationship "E"=f (deformation). The energy release rate "E" is equal to W0*h0, where W0=energy supplied to the material per cycle and per unit volume and h0=initial height of the test specimen. Thus by making use of the force/displacement readings it is possible to find the relationship between "E" and the amplitude of the loading.

The measurement of cracking, after the test specimen "PS" has been notched. The information obtained can be used to determine the propagation speed of the crack "Vp" as a function of the level of loading applied "E".

The inventors have been able to demonstrate that the cohesion of said at least one skim coat of at least one working crown layer according to the invention remains satisfactory.

The inventors have, notably, demonstrated that the presence of at least one layer of circumferential reinforcing elements helps to reduce the changes in cohesion of the skim coats of the working crown layers. In fact, the most commonly used tire designs, including, notably, skim coats of the working crown layers with values of $\tan(\delta)_{max}$ greater than 0.120 cause a change in the cohesion of said skim coats of the working crown layers, tending to weaken this cohesion. The inventors have found that the presence of at least one layer of circumferential reinforcing elements, which limits the shear stresses between the ends of the working crown layers and also limits the temperature increases, results in a small change in the cohesion of said skim coats of the working crown layers. The inventors consider, therefore, that the cohesion of said at least one skim coat of at least one working crown layer, which is lower than that found in the most commonly used tire designs, is satisfactory in the tire design according to the invention.

The inventors have also been able to demonstrate that the presence of at least one layer of circumferential reinforcing elements enables satisfactory performance to be maintained, notably in terms of endurance but also in terms of wear, with the combination of a tensile modulus of elasticity at 10% elongation of said at least one skim coat of at least one working crown layer greater than 9 MPa and a value of $\tan(\delta)_{max}$ of said at least one skim coat of at least one working crown layer below 0.100.

In a preferred embodiment of the invention, the tire including a layer C of rubber mixture placed between at least the ends of at least two working crown layers and said at least two working crown layers having unequal axial widths, the distance d between the end of the axially narrowest working layer and the working layer separated from the axially narrowest working layer by the layer C of rubber mixture is such that $1.1\emptyset < d < 2.2\emptyset$, where ø is the diameter of the reinforcing elements of said at least one layer of circumferential reinforcing elements and, in a meridian plane, the thickness of the layer C of rubber mixture being substantially constant over its axial width between the axially inner end of the layer C and the end of the axially narrowest working layer.

For the purposes of the invention, the distance d is measured in a meridian plane from cord to cord, that is to say between the cord of a first working layer and the cord of a second working layer, in a direction substantially perpendicular to the surfaces of the layer C. In other words, this distance d includes the thickness of the first layer C and the respective thicknesses of the rubber skim mixtures radially outside the cords of the radially inner working layer and radially inside the cords of the radially outer working layer.

For the purposes of embodiments of the invention, the thickness of the layer C of rubber mixture is measured between the two surfaces of said layer C along the orthogonal projection of a point of one surface on to the other surface.

For the purposes of embodiments of the invention, the statement that the thickness of the layer C of rubber mixture is substantially constant signifies that it does not vary by more than 0.3 mm. These variations of thickness are due solely to creep phenomena during the building and curing of the tire. The layer C in the form of a semi-finished product, that is to say in the form of elements ready for use for tire production, thus advantageously has a constant thickness.

The various thickness measurements are made on a cross section of a tire, the tire therefore being in a non-inflated state.

The layer C of rubber mixture can be used to decouple said working crown layers in order to distribute the shear stresses over a greater thickness.

For the purposes of embodiments of the invention, coupled layers are layers whose respective reinforcing elements are separated radially by not more than 1.5 mm, said thickness of rubber being measured radially between the upper and lower generatrices, respectively, of said reinforcing elements.

The most commonly used tire designs include layers of rubber mixture placed between the ends of the working crown layers, with greater thicknesses, notably, at the end of the narrowest working layer and with a non-uniform thickness profile when viewed along a meridian section of the tire in order to permit this thickness and avoid excessive disturbance of the environment of the end of the narrowest working layer. As explained above, the presence of this layer of rubber mixture makes it possible, notably, to limit the shear stresses between the ends of the working crown layers, the circumferential rigidities of said working crown layers being zero at their ends. The distance between the end of the axially narrowest working layer and the working layer separated from the axially narrowest working layer by the layer of rubber mixture, measured according to the definition of d above, is commonly greater than 3.3 mm. This corresponds to a thickness of the layer of rubber mixture of at least 2.5 mm, whereas its thickness generally tends towards a value of less than 0.5 mm at each of its ends.

The inventors have been able to demonstrate that the presence of at least one layer of circumferential reinforcing elements enables satisfactory performance to be maintained, notably in terms of endurance but also in terms of wear, with a layer of rubber mixture whose thickness is substantially constant over the axial width between the axially inner end of the layer C and the end of the axially narrowest working layer, and is such that the distance d is in the range from $1.1\phi$ and $2.2\phi$. In fact it appears that the presence of the layer of circumferential reinforcing elements contributes sufficiently to the absorption of at least some of the circumferential tension, notably during passage through the footprint, to decrease the shear stresses between the ends of the working crown layers.

Additionally, the layer C of rubber mixture, when in the state of a semi-finished product, thus advantageously takes the form of a layer of constant thickness which is easy to manufacture and which can also be stored easily. In fact, the layers commonly used, as described above, which have a shape with variations of thickness in cross section, are, on the one hand, more difficult to produce, and, on the other hand, more difficult to store. In fact, the variations of thickness lead to problems of storage, these semi-finished products usually being stored in reel-wound form. The layer C according to the invention, when in the state of a semi-finished product, has a cross section with a substantially flat profile by comparison with the commonly used layers, which, when in the state of semi-finished products, have a cross section with a substantially rounded profile.

Since the manufacture and storage of the layer of rubber mixture according to embodiments of the invention in the form of a semi-finished product are simplified in this way to such an extent, the costs of production of the tire may be reduced as a result, even though the tire may include an additional layer of circumferential reinforcing elements as compared with an ordinary tire.

In an advantageous embodiment of the invention, the axially widest working crown layer lies radially inside the other working crown layers.

Also, preferably, the axial width D of the layer of rubber mixture C lying between the axially innermost end of said layer of rubber mixture C the end of the axially least wide working crown layer is such that:

$$3 \cdot \phi_2 \leq D \leq 25 \cdot \phi_2$$

where $\phi_2$ is the diameter of the reinforcing elements of the axially least wide working crown layer. This relation defines an area of engagement between the layer of rubber mixture C and the axially least wide working crown layer. If the size of this engagement area is less than three times the diameter of the reinforcing elements of the axially least wide working layer, it may be insufficient to provide decoupling of the working crown layers for the purpose, notably, of attenuating the stresses at the end of the axially least wide working crown layer. If the size of this engagement area is more than twenty times the diameter of the reinforcing elements of the axially least wide working layer, this may lead to an excessive decrease in the drift rigidity of the crown reinforcement of the tire.

Preferably, the axial width D of the layer of rubber mixture C lying between the axially innermost end of said layer of rubber mixture C and the end of the axially least wide working crown layer is greater than 5 mm.

In an advantageous embodiment of the invention, said reinforcing elements of at least one working crown layer are saturated layered cords, at least one inner layer being sheathed in a layer formed by a polymeric composition such as a non-cross-linkable, cross-linkable or cross-linked rubber composition, preferably based on at least one diene elastomer.

Cords known as "layered" ("layered cords") or "multi-layered" are cords formed by a central core and one or more practically concentric layers of strands or threads arranged around this central core.

For the purposes of the invention, a saturated layer of a layered cord is a layer formed by threads in which there is no room to add one or more supplementary threads.

The inventors have been able to demonstrate that the presence of the cords as described above acting as reinforcing elements of the working crown layers can contribute to better performance in terms of endurance.

In fact, it appears, as explained above, that the rubber mixtures of the skim coats of the working layers make it possible to reduce the rolling resistance of the tire. This is manifested by a reduction of the temperatures of these rubber mixtures during the use of the tire, which may result in decreased protection of the reinforcing elements from oxidation phenomena in certain cases in which the tire is used. This is because the properties of the rubber mixtures relating to oxygen blocking diminish with heat, and the presence of oxygen may lead to a progressive degeneration of the mechanical properties of the cords, in the most severe conditions of travel, and may adversely affect the life of these cords.

The presence of the rubber sheath within the cords described above provides compensation for this possible risk of oxidation of the reinforcing elements, since the sheath contributes to oxygen blocking.

The expression "composition based on at least one diene elastomer" is interpreted, in a known way, as meaning that the composition has a majority content (i.e. a fraction of more than 50% by weight) of this or these diene elastomers.

It should be noted that the sheath according to embodiments of the invention extends continuously around the layer that it covers (that is to say, this sheath is continuous in the "orthoradial" direction of the cord which is perpendicular to its radius), so as to form a continuous sleeve having a cross section which is advantageously practically circular.

It should also be noted that the rubber composition of this sheath may be cross-linkable or cross-linked type; in other words, it comprises, by definition, a cross-linking system adapted to allow the composition to be cross-linked in the course of its curing (i.e. its hardening, not its melting); thus this rubber composition may be described as non-meltable, because it cannot be melted by heating, regardless of the temperature.

The term "diene" elastomer or rubber denotes, in a known way, an elastomer which is based, partially at least (that is to say, it is a homopolymer or a copolymer), on diene monomers (monomers with two carbon-carbon double bonds, which may or may not be conjugated).

Preferably, the cross-linking system of the rubber matrix is what is known as a vulcanization system, in other words one which is based on sulphur (or a sulphur-donating agent) and a primary vulcanization accelerator. This basic vulcanization system may be supplemented with various known secondary accelerators or vulcanization accelerators.

The rubber composition of the sheath according to embodiments of the invention may comprise, in addition to said cross-linking system all the customary ingredients that can be used in rubber compositions for tires, such as reinforcing fillers based on carbon black and/or an inorganic reinforcing filler such as silica, anti-aging agents such as antioxidants, extending oils, plasticizers or agents facilitating the use of the compositions in the green state, bismaleimides, adhesion promoters consisting of metal salts, notably cobalt salts.

Preferably, the composition of this sheath is chosen so as to be identical to the composition used for the skim coat of the working crown layer that is to be reinforced by the cords. Thus there is no problem of possible incompatibility between the respective materials of the sheath and the rubber matrix.

According to a variant of the invention, said cords of at least one working crown layer are layered cords with an [L+M] structure, having a first layer C1 with L threads of diameter $d_1$ wound together in a spiral with a pitch $p_1$ with L varying from 1 to 4, surrounded by at least one intermediate layer C2 with M threads of diameter $d_2$ wound together in a spiral with a pitch $p_2$ with M varying from 3 to 12, a sheath formed by a non-cross-linkable, cross-linkable or cross-linked rubber composition based on at least one diene elastomer, covering said first layer C1 in the structure.

Preferably, the diameter of the threads of the first layer of the inner layer (C1) is in the range from 0.10 to 0.5 mm, and the diameter of the threads of the outer layer (C2) is in the range from 0.10 to 0.5 mm.

Preferably, also, the pitch of the spiral winding of said threads of the outer layer (C2) is in the range from 8 to 25 mm.

For the purposes of embodiments of the invention, the pitch of the spiral represents the length, measured parallel to the axis of the cord, at the end of which a thread having this pitch completes a full turn around the axis of the cord; thus, if the axis is divided by two planes perpendicular to said axis and separated by a length equal to the pitch of a thread of a layer forming the cord, the axis of this thread has the same position in these two planes on the two circles corresponding to the layer of the thread in question.

Advantageously, the cord has one, or even more preferably all, of the following characteristics:

the layer C2 is a saturated layer, that is to say there is not enough room in this layer to add at least one (N+1)th thread of diameter $d_2$, N then representing the maximum number of threads that can be wound in a layer around the layer C1;

the rubber sheath also covers the inner layer C1 and/or separates the threads in pairs adjacent to the outer layer C2;

the rubber sheath practically covers half the radially inner circumference of each thread of the layer C2, in such a way that it separates the threads in pairs adjacent to this layer C2.

Preferably, the rubber sheath has an average thickness in the range from 0.010 mm to 0.040 mm.

As a general rule, said cords according to embodiments of the invention may be made of any type of metallic threads, notably of steel, for example carbon steel and/or stainless steel threads. A carbon steel is preferably used, but evidently it is possible to use other steels or other alloys.

If a carbon steel is used, its carbon content (% by weight of steel) is preferably in the range from 0.1% to 1.2%, or more preferably from 0.4% to 1.0%; these contents represent a good compromise between the requisite mechanical properties of the tire and the feasibility of the thread. It should be noted that a carbon content in the range from 0.5% to 0.6% makes these steels ultimately less costly, as they are more easily drawn. Another advantageous embodiment of the invention may also consist, according to the intended applications, in the use of steels with a low carbon content, in the range from 0.2% to 0.5% for example, notably because of the lower cost and greater ease of drawing.

Said cords according to embodiments of the invention may be produced by different methods known to those skilled in the art, for example in two steps, initially by sheathing the core or layers C1 using an extrusion head, this step being followed subsequently by a final operation of cording or twisting the remaining M threads (layer C2) around the layer C1 sheathed in this way. The problem of tackiness in the green state posed by the rubber sheath during any necessary intermediate operations of winding and unwinding may be overcome in a manner known to those skilled in the art, for example by using an interlayer film of plastic material.

These cords of at least one working crown layer are, for example, chosen from among the cords described in patent applications WO 2006/013077 and WO 2009/083212.

In an advantageous variant embodiment of the invention, the layer of circumferential reinforcing elements has an axial width of more than $0.5 \times S$.

S is the axial maximum width of the tire, when the latter is mounted on its service rim and inflated to its recommended pressure.

The axial widths of the reinforcing elements are measured on a cross section of a tire, the tire therefore being in a non-inflated state.

In a preferred embodiment of the invention, where at least two working crown layers have different axial widths, the difference between the axial width of the axially widest working crown layer and the axial width of the axially least wide working crown layer being in the range from 10 to 30 mm.

In a preferred embodiment of the invention, the layer of circumferential reinforcing elements is radially positioned between two working crown layers.

In this embodiment of the invention, the layer of circumferential reinforcing elements can limit compressive action on the reinforcing elements of the carcass reinforcement to a greater extent than a similar layer placed radially outside the working layers. It is preferably radially separated from the carcass reinforcement by at least one working layer so as to limit the stresses on said reinforcing elements and prevent excess fatigue in them.

Also advantageously according to embodiments of the invention, the axial widths of the working crown layers radially adjacent to the layer of circumferential reinforcing elements are greater than the axial width of said layer of circumferential reinforcing elements, and said working crown layers adjacent to the layer of circumferential reinforcing elements are preferably coupled over an axial width, on either side of the equatorial plane and in the immediate axial extension of the layer of circumferential reinforcing elements, and are subsequently decoupled by said layer of rubber mixture C at least over the remainder of the width common to said two working layers.

The presence of these couplings between the working crown layers adjacent to the layer of circumferential reinforcing elements makes it possible to reduce the tensile stresses acting on the axially outermost circumferential elements located nearest to the coupling.

In one advantageous embodiment of the invention, the reinforcing elements of at least one layer of circumferential reinforcing elements are metallic reinforcing elements having a secant modulus at 0.7% elongation in the range from 10 to 120 GPa and a maximum tangent modulus of less than 150 GPa.

In a preferred embodiment, the second modulus of the reinforcing elements at 0.7% elongation is less than 100 GPa and more than 20 GPa, preferably in the range from 30 to 90 GPa, and even more preferably less than 80 GPa.

Also preferably, the maximum tangent modulus of the reinforcing elements is less than 130 GPa and even more preferably less than 120 GPa.

The moduli expressed above are measured on a curve of tensile stress as a function of the elongation determined with a prestress of 20 MPa based on the metal cross section of the reinforcing element, where the tensile stress corresponds to a measured tension based on the metal cross section of the reinforcing element.

The moduli of the same reinforcing elements may be measured on a curve of tensile stress as a function of the elongation determined with a prestress of 10 MPa based on the total cross section of the reinforcing element, where the tensile stress corresponds to a measured tension based on the total cross section of the reinforcing element. The total cross section of the reinforcing element is the cross section of a composite element made of metal and rubber, the latter having, notably, penetrated the reinforcing element during the tire curing stage.

According to this formulation relating to the total cross section of the reinforcing element, the reinforcing elements of the axially outer parts and of the central part of at least one layer of circumferential reinforcing elements are metallic reinforcing elements having a secant modulus at 0.7% elongation in the range from 5 to 60 GPa and a maximum tangent modulus of less than 75 GPa.

In a preferred embodiment, the secant modulus of the reinforcing elements at 0.7% elongation is less than 50 GPa and more than 10 GPa, preferably in the range from 15 to 45 GPa, and even more preferably less than 40 GPa.

Also preferably, the maximum tangent modulus of the reinforcing elements is less than 65 GPa and even more preferably less than 60 GPa.

In a preferred embodiment, the reinforcing elements of at least one layer of circumferential reinforcing elements are metallic reinforcing elements for which the tensile stress curve as a function of the relative elongation shows shallow gradients for small elongations and a substantially constant steep gradient for greater elongations. These reinforcing elements of the additional layer are commonly called "bi-modulus" elements.

In a preferred embodiment of the invention, the substantially constant steep gradient appears from the point of a relative elongation in the range from 0.1% to 0.5%.

The various characteristics of the reinforcing elements mentioned above are measured on reinforcing elements taken from tires.

Reinforcing elements which are more particularly suitable for the production of at least one layer of circumferential reinforcing elements according to the invention are, for example, assemblies having the formula 21.23, the structure of which is 3×(0.26+6×0.23) 4.4/6.6 SS; this stranded cord is formed by 21 elementary threads having the formula 3×(1+6), with three strands stranded together, each formed by 7 threads, namely one thread forming a central core with a diameter of 26/100 mm and 6 wound threads with a diameter of 23/100 mm. This cord has a secant modulus at 0.7% equal to 45 GPa and a maximum tangent modulus equal to 98 GPa, measured on a curve of tensile stress as a function of the elongation determined with a prestress of 20 MPa based on the metal cross section of the reinforcing element, where the tensile stress corresponds to a measured tension based on the metal cross section of the reinforcing element. On a curve of tensile stress as a function of the elongation determined with a prestress of 10 MPa based on the total cross section of the reinforcing element, where the tensile stress corresponds to a measured tension based on the total cross section of the reinforcing element, this cord with the formula 21.23 has a secant modulus at 0.7% equal to 23 GPa and a maximum tangent modulus equal to 49 GPa.

Similarly, another example of reinforcing elements is an assembly having the formula 21.28, the structure of which is 3×(0.32+6×0.28) 6.2/9.3 SS. This cord has a secant modulus at 0.7% equal to 56 GPa and a maximum tangent modulus equal to 102 GPa, measured on a curve of tensile stress as a function of the elongation determined with a prestress of 20 MPa based on the metal cross section of the reinforcing element, where the tensile stress corresponds to a measured tension based on the metal cross section of the reinforcing element. On a curve of tensile stress as a function of the elongation determined with a prestress of 10 MPa based on the total cross section of the reinforcing element, where the tensile stress corresponds to a measured tension based on the total cross section of the reinforcing element, this cord with the formula 21.28 has a secant modulus at 0.7% equal to 27 GPa and a maximum tangent modulus equal to 49 GPa.

By using these reinforcing elements in at least one layer of circumferential reinforcing elements it is possible, notably, to maintain satisfactory rigidity of the layer, even after the steps of shaping and curing, in ordinary production processes.

In a second embodiment of the invention, the circumferential reinforcing elements may be formed by inextensible metallic elements cut so as to form sections whose length is much smaller than the circumference of the shortest layer, but preferably greater than 0.1 of said circumference, the cuts between sections being axially offset from one another. Also preferably, the tensile modulus of elasticity per unit width of the additional layer is less than the tensile modulus of elasticity, measured in the same conditions, of the most extensible working crown layer. This embodiment provides a simple way of giving the layer of circumferential reinforcing elements a modulus that can easily be adjusted (by the choice of the intervals between the sections of the same rows), but that is, in all cases, lower than the modulus of the layer composed of the same metallic elements in continuous form, the modulus of the additional layer being measured on a vulcanized layer of cut elements taken from the tire.

In a third embodiment of the invention, the circumferential reinforcing elements are undulating metal elements, the ratio $a/\lambda$ of the amplitude of undulation to the wavelength being not more than 0.09. Preferably, the tensile modulus of elasticity per unit width of the additional layer is less than the tensile modulus of elasticity, measured in the same conditions, of the most extensible working crown layer.

The metal elements are preferably steel cords.

In a preferred embodiment of the invention, the reinforcing elements of the working crown layers are inextensible metal cords.

In order to reduce the tensile stresses acting on the axially outermost circumferential elements, the invention also advantageously provides for the angle formed with the circumferential direction by the reinforcing elements of the working crown layers to be less than 30° and preferably less than 25°.

A preferred embodiment of the invention also provides for the crown reinforcement to be supplemented on its radially outer side by at least one additional layer, called the protective layer, of what are called elastic reinforcing elements, orientated with respect to the circumferential direction at an angle in the range from 10° to 45° and in the same direction as the angle formed by the inextensible elements of the working layer which is radially adjacent to the protective layer.

The protective layer may have an axial width which is less than the axial width of the least wide working layer. Said protective layer may also have an axial width greater than the axial width of the least wide working layer, such that it covers the edges of the least wide working layer and, if the radially upper layer is the least wide layer, such that it is coupled, in the axial extension of the additional reinforcement, to the widest working crown layer over an axial width, and is then decoupled in an axially outer position from said widest working layer by profiled elements with a thickness of at least 2 mm. In the aforementioned case, the protective layer formed by elastic reinforcing elements may, on the one hand, be decoupled if required from the edges of said least wide working layer by profiled elements with a thickness substantially less than the thickness of the profiled elements separating the edges of the two working layers, and, on the other hand, have an axial width less than or greater than the axial width of the widest crown layer.

In any of the aforementioned embodiments of the invention, the crown reinforcement may also be supplemented on its radially inner side, between the carcass reinforcement and the radially inner working layer nearest to said carcass reinforcement, by a triangulation layer of inextensible metal reinforcing elements made of steel, forming an angle of more than 60° with the circumferential direction and in the same direction as the angle formed by the reinforcing elements of the layer which is radially nearest to the carcass reinforcement.

The tire according to embodiments of the invention as described above therefore has improved rolling resistance by comparison with ordinary tires, while maintaining comparable performance in terms of endurance and wear.

BRIEF DESCRIPTION OF DRAWINGS

Other characteristics and advantages of the invention will be made clearer by the following description of exemplary embodiments of the invention, with reference to FIGS. 1 to 3, which show.

DETAILED DESCRIPTION OF SPECIFIC EMBODIMENTS

In order to simplify the understanding of the figures, they are not shown to scale. The figures shown only a half-view of a tire which extends symmetrically about the axis XX' which represents the circumferential mid-plane, or equatorial plane, of a tire.

Figure 1:
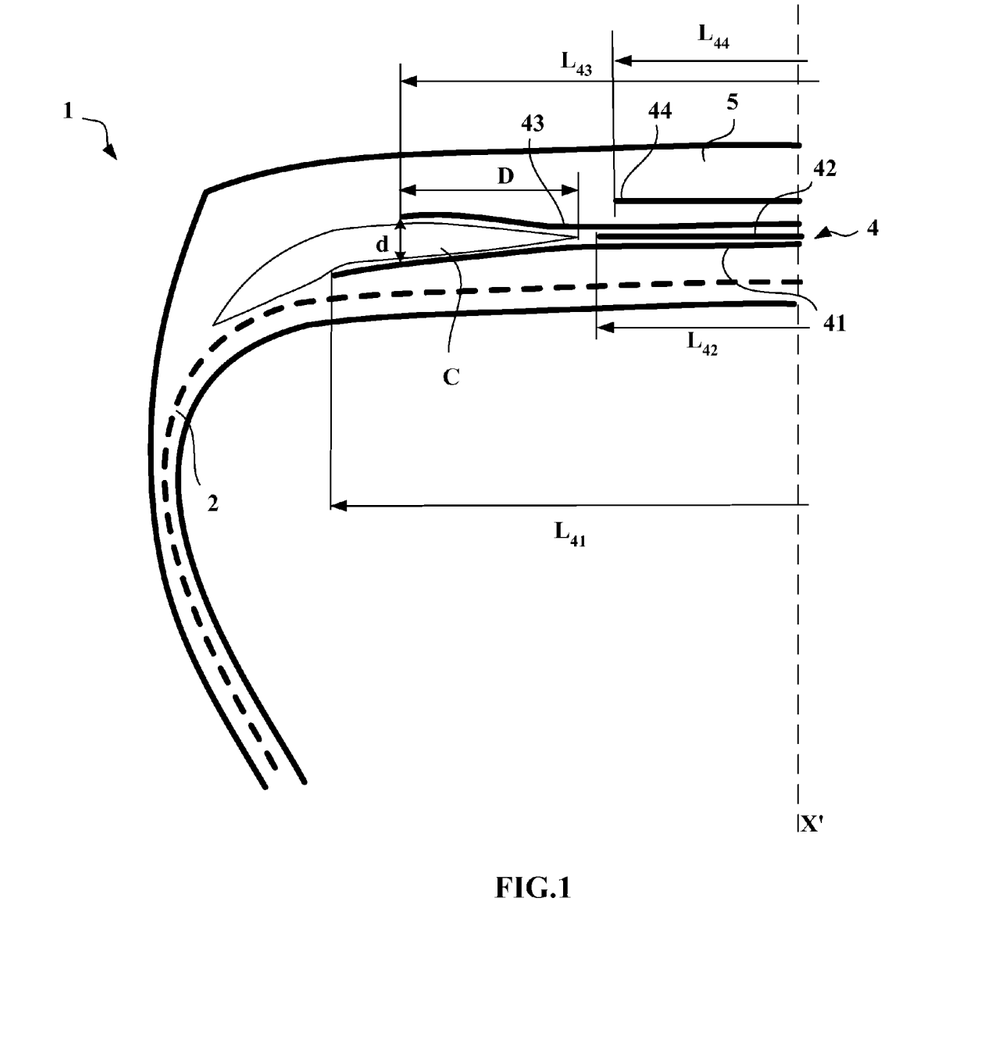
in FIG. 1, a meridian view of a tire layout according to an embodiment of the invention, in FIG. 2, a meridian view of a tire layout according to a second embodiment of the invention, and in FIG. 3, a meridian view of a tire layout according to a third embodiment of the invention.

In FIG. 1, the tire 1, with a size of 315/70 R 22.5, has a shape ratio H/S equal to 0.70, where H is the height of the tire 1 on its mounting rim and S is its maximum axial width. Said tire 1 comprises a radial carcass reinforcement 2 fixed in two beads, not shown in the figure. The carcass reinforcement is formed by a single layer of metal cords. This carcass reinforcement 2 is wrapped with a crown reinforcement 4, formed radially, from the inside to the outside, from:

- a first working layer 41 formed from inextensible metal cords 9.28 which are not wrapped, these cords being continuous over the whole width of the layer and orientated at an angle of 24°,
- a layer of circumferential reinforcing elements 42 formed from metal cords made of 21×23 steel, of the "bi-modulus" type,
- a second working layer 43 formed from inextensible metal cords 9.28 which are not wrapped, these cords being continuous over the whole width of the layer, being orientated at an angle of 24°, and crossing over the metal cords of the layer 41, and
- a protective layer 44 formed from elastic 6.35 metal cords.

The crown reinforcement is itself capped with a tread 5.

The maximum axial width S of the tire is equal to 317 mm.

The axial width $L_{41}$ of the first working layer 41 is equal to 252 mm.

The axial width $L_{43}$ of the second working layer 43 is equal to 232 mm.

As regards the axial width $L_{42}$ of the layer of circumferential reinforcing elements 42, this is equal to 194 mm.

The last crown layer 44, called the protective layer, has a width $L_{44}$ equal to 124 mm.

A layer of rubber mixture C is also present for decoupling of the ends of the working crown layers 41 and 43.

The area of engagement of the layer C between the two working crown layers 41 and 43 is defined by its thickness, or more precisely by the radial distance d between the end of the layer 43 and the layer 41, and by the axial width D of the layer C between the axially inner end of said layer C and the end of the radially outer working crown layer 43. The radial distance d is equal to 3.5 mm. The axial distance D is equal to 20 mm.

Figure 2:
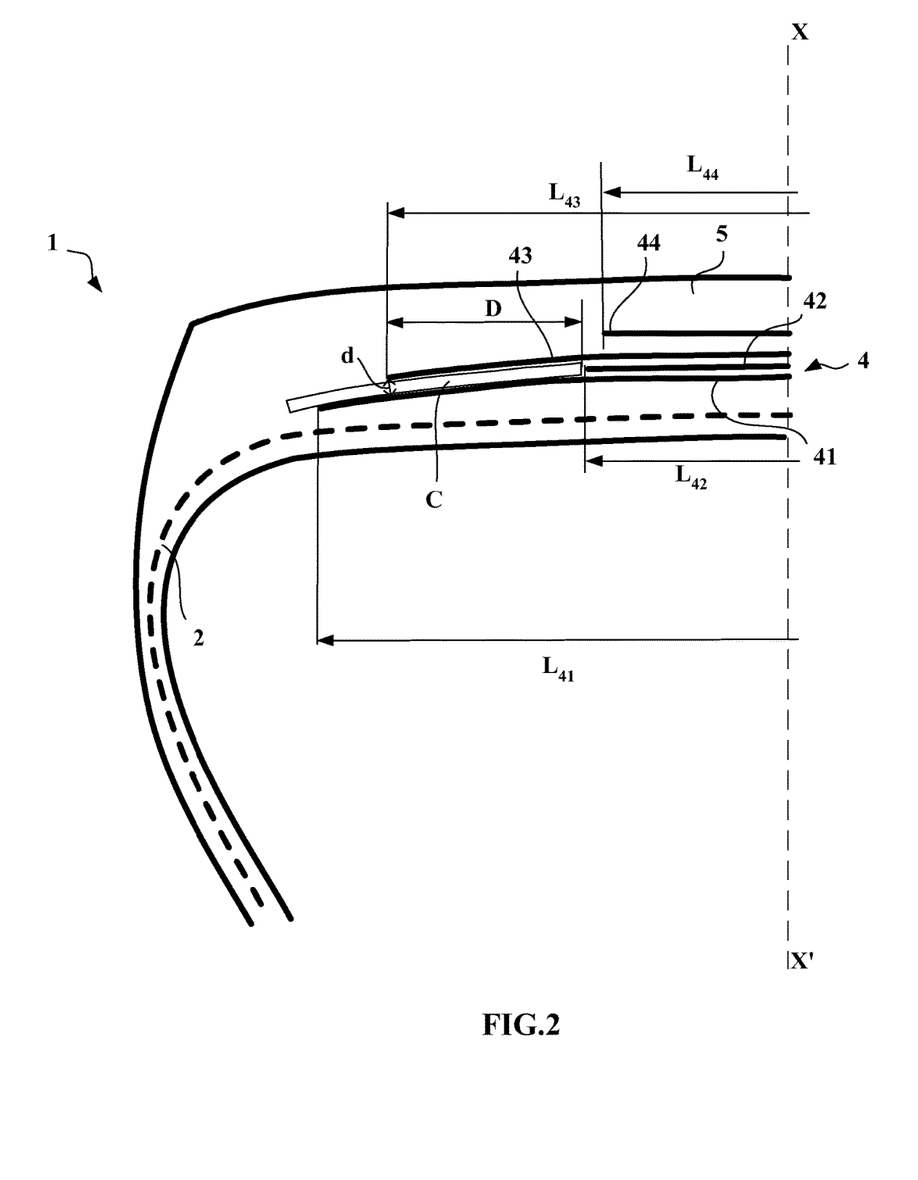

In FIG. 2, the tire 1 differs from that of FIG. 1 in the shape of the layer C which is substantially flat. The radial distance d is equal to 2 mm, corresponding to a thickness of the layer C equal to 1.2 mm. According to the variant of the invention shown in FIG. 2, the thickness of the layer C is substantially identical in a meridian view over the axial width between the axially inner end of the layer C and the end of the axially narrowest working layer.

The diameter of the circumferential reinforcing elements of the layer 42 is equal to 1.35 mm. The distance d is therefore equal to 1.48 times the diameter ø of these elements.

Figure 3:
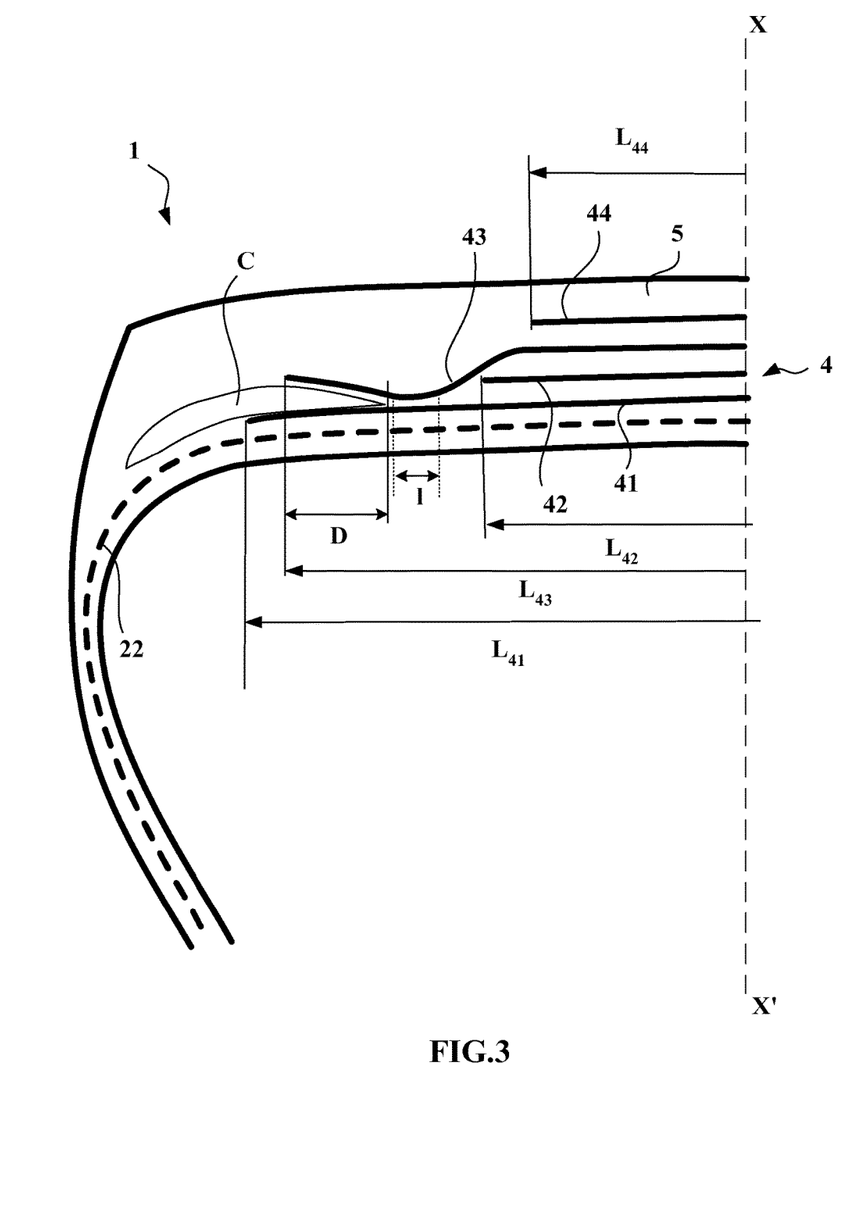

In FIG. 3, the tire 1 differs from that shown in FIG. 1 in that the two working layers 41 and 43 are coupled over an axial width 1, on either side of the equatorial plane and axially in the extension of the layer of circumferential reinforcing elements 42: the cords of the first working layer 41 and the cords of the second working layer 43, over the axial coupling width 1 of the two layers, are separated radially from one another by a layer of rubber whose thickness is minimal and is equal to twice the thickness of the rubber skim coat of the non-wrapped 9.28 metal cords from which each working layer 41, 43 is formed, that is to say 0.8 mm. Over the remainder of the width common to the two working layers, the two working layers 41, 43 are separated by the layer of rubber mixture C, the thickness of said layer C increasing from the axial end of the coupling area to the end of the least wide working layer 43. The length of the layer C is advantageously sufficient to radially cover the end of the widest working layer 41, which in this case is the working layer radially nearest to the carcass reinforcement.

Tests have been conducted with different tires made according to the invention as shown in FIGS. 1 and 2, and with control tires.

The different mixtures used in these tires to form the skim coat mixtures of the working layers are listed below, the tensile modulus of elasticity for each mixture at 10%elongation being stated, together with the values of $tan(\delta)_{max}$ and P60.

|  | Mixture R1 | Mixture 1 |
| --- | --- | --- |
| NR | 100 | 100 |
| Black N347 | 52 |  |
| Black N683 |  | 63 |
| Antioxidant (6PPD) | 1 | 1 |
| Stearic acid | 0.65 | 0.65 |
| Zinc oxide | 9.3 | 9.3 |
| Cobalt salt (AcacCo) | 1.12 | 1.12 |
| sulphur | 6.1 | 6.1 |
| Accelerator DCBS | 0.93 | 0.93 |
| Retarder CTP (PVI) | 0.25 | 0.25 |

|  | Mixture R1 | Mixture 1 |
| --- | --- | --- |
| $MA_{10}$ (MPa) | 10.4 | 10.03 |
| $tan(\delta)_{max}$ | 0.130 | 0.092 |
| P60 (%) | 22.9 | 17.4 |

The values of the constituents are expressed in phr (parts by weight per hundred parts of elastomers).

Regarding the control tire T1, this has no circumferential reinforcing elements and the skim coats of the working layers are formed from the mixture R1.

A first tire P1 according to the invention as shown in FIG. 1 was made with skim coats of the working layers made of the mixture R1.

A second tire P2 according to the invention was made with skim coats of the working layers made of the mixture R1 and with a layer C of rubber mixture having a distance d equal to 3.5 mm and having a flat cross-sectional profile as shown in FIG. 2.

First endurance tests were conducted on a test machine, each tire being made to roll in a straight line at a speed equal to the maximum speed rating (or speed index) specified for said tire under an initial load of 4000 kg which was progressively increased to reduce the duration of the test.

Other endurance tests were conducted on a test machine, a transverse force and a dynamic overload being applied to the tires in a cyclic manner. The tests were conducted on the tires according to the invention in conditions identical to those used for the control tires.

The tests conducted in this way demonstrated that the distances traveled by the tires according to the invention in each of these tests were at least as great as, or even greater than, the distances traveled by the control tire T1. It appears, therefore, that the performance of the tires according to the invention is at least as good as that of the control tires.

These tests demonstrate, notably, that the design of the tires according to the invention makes it possible to use skim coats of the working crown layers combining a tensile modulus of elasticity at 10% elongation of more than 9 MPa and a value of $tan(\delta)_{max}$ of less than 0.100, and possibly associated with a layer C having a flat profile, without detracting from performance in terms of endurance when a layer of circumferential reinforcing elements is present.

Measurements of rolling resistance were also made. These measurements were made on a first control tire T1 as described above, on a second control tire T2 identical to the former but further including a layer of circumferential reinforcing elements identical to those of the tires according to the invention, and also on the tires P1 and P2 according to the invention.

The results of the measurements are shown in the following table; they are expressed in kg/t, with a value of 100 assigned to tire T1.

| Tire T1 | Tire T2 | Tire P1 | Tire P2 |
| --- | --- | --- | --- |
| 100 | 101 | 99 | 98 |

The invention claimed is:

1. A tire with a radial carcass reinforcement, comprising: a crown reinforcement formed from at least two working crown layers of reinforcing elements, with one layer crossing the next at angles in the range from 10° to 45° with the circumferential direction, said at least two working crown layers each being formed of reinforcing elements inserted between two skim coats of rubber mixture, and including a layer of circumferential reinforcing elements, wherein the tensile modulus of elasticity at 10% elongation of at least one skim coat of at least one working crown layer is greater than 9 MPa, wherein the maximum value of tan δ denoted tan δ max, of said at least one skim coat of at least one working crown layer is less than 0.100, wherein said at least one skim coat of at least one working crown layer is an elastomeric mixture based on:

natural rubber or synthetic polyisoprene with a majority of cis-1,4 chains, and optionally at least one other diene elastomer, the natural rubber or the synthetic polyisoprene in case of blending being present in a majority proportion relative to the proportion of the other diene elastomer or elastomers used, and a reinforcing filler composed of carbon black with a BET specific surface of less than or equal to 44 $m^2/g$, regardless of its structural index, used in a proportion of 40 to 100 phr, and a tread radially capping the crown reinforcement and joined to two beads via two sidewalls.

2. The tire according to claim 1, further comprising a layer C of rubber mixture placed between at least ends of said at least two working crown layers, and wherein said at least two working crown layers having unequal axial widths, wherein a distance d between an end of an axially narrowest working layer and a working layer separated from the axially narrowest working layer by the layer C of rubber mixture is such that 1.1ø<d<2.2ø, where ø is the diameter of the reinforcing elements of said at least one layer of circumferential reinforcing elements and wherein, in a meridian plane, a thickness of the layer C of rubber mixture is substantially constant over an axial width between an axially inner end of the layer C and the end of the axially narrowest working layer.

3. The tire according to claim 1, wherein said reinforcing elements of at least one working crown layer are saturated layered cords, wherein at least one inner layer is sheathed in a layer formed by a polymeric composition that is a non-cross-linkable, cross-linkable or cross-linked rubber composition.

4. The tire according to claim 1, wherein the layer of circumferential reinforcing elements is radially positioned between two working crown layers.

5. The tire according to claim 1, wherein said at least two working crown layers have different axial widths, wherein the difference between an axial width of an axially widest working crown layer and an axial width of an axially least wide working crown layer is in the range of 10 to 30 mm.

6. The tire according to claim 5, wherein the axially widest working crown layer lies radially inside the other working crown layers.

7. The tire according to claim 1, wherein axial widths of the working crown layers radially adjacent to the layer of circumferential reinforcing elements are greater than an axial width of said layer of circumferential reinforcing elements.

8. The tire according to claim 7, wherein the working crown layers adjacent to the layer of circumferential reinforcing elements are coupled over an axial width, on either side of the equatorial plane and in the immediate axial extension of the layer of circumferential reinforcing elements, and are subsequently decoupled by profiled elements of rubber mixture at least over the remainder of the width common to said two working layers.

9. The tire according to claim 1, wherein the reinforcing elements of said layer of circumferential reinforcing elements are metallic reinforcing elements having a secant modulus at 0.7% elongation in the range from 10 to 120 GPa and a maximum tangent modulus of less than 150 GPa.

10. The tire according to claim 1, wherein the reinforcing elements of the working crown layers are inextensible.

11. The tire according to claim 1, wherein the angle formed with the circumferential direction by the reinforcing elements of the working crown layers is less than 30°.

12. The tire according to claim 1, wherein the crown reinforcement is supplemented on its radially outer side by at least one additional layer, called the protective layer, of elastic reinforcing elements, oriented with respect to the circumferential direction at an angle in the range from 10° to 45° and in the same direction as the angle formed by inextensible elements of the working layer which is radially adjacent to the protective layer.

13. The tire according to claim 1, wherein the crown reinforcement further includes a triangulation layer formed from metallic reinforcing elements forming angles of more than 60° with the circumferential direction.

* * * * *